INVENTOR.
WILLARD J. OPOCENSKY,
BY

ATTORNEY.

United States Patent Office 2,823,561
Patented Feb. 18, 1958

2,823,561

HUNTING TOOTH STOP STRUCTURE

Willard J. Opocensky, Glendale, Calif., assignor to Librascope, Incorporated, Glendale, Calif., a corporation of California Application January 18, 1952, Serial No. 267,079

11 Claims. (Cl. 74—802)

This invention relates to limit stops, and particularly to devices for positively preventing the rotation of a member after a predetermined number of revolutions.

In certain equipment it is desired to permit a shaft or similar member to turn freely thru a prescribed number of revolutions, while providing a positive stop or limiting action at each end of that range. I have invented an improvement in hunting tooth stop mechanisms for accomplishing this result.

This application is a continuation-in-part of my pending United States application entitled "Limit Stop Mechanism for Potentiometers or the Like," filed October 21, 1950 with Serial Number 193,172 now Patent No. 2,599,934. The invention represents an improvement in the field of rotation-limiting devices, and is applicable to a great many other types of equipment, as well as to the combination with a helical potentiometer there shown.

This result is attained by using two cams or hunting teeth of certain shapes associated with two meshing gears having differing numbers of teeth. One of the meshing gears is driven by the shaft to be limited in its rotational range. The difference in the number of gear teeth causes a continuous change in the relative angular relation between the two gears during rotation. The cams are shaped so that in certain relative angular positions the two gears may rotate freely, while at either end of the desired range, the cam members will engage each other and prevent further movement in that direction.

It is thus the object of my invention to provide a positive, easily constructed and durable limiting mechanism requiring a minimum of adjustments and maintenance.

Another object is to provide a limiting device for rotating equipment which includes operating parts too delicate to withstand the shock of abruptly terminating the rotation themselves.

Embodiments of the invention thru which these and other objects may be achieved are shown in the drawings, wherein.

Figure 1:
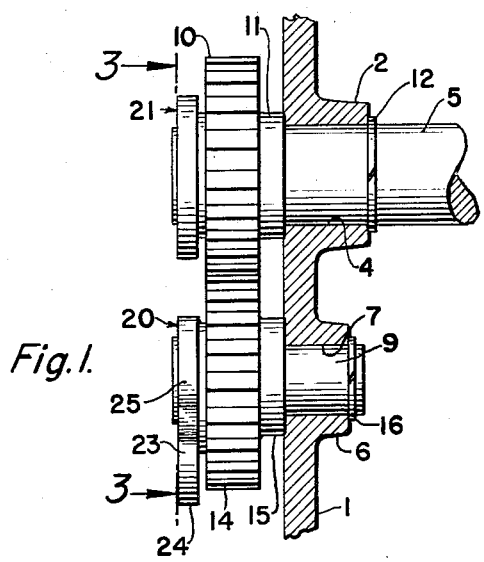
Fig. 1 is a view, partially in section, of a preferred form of the invention.
Figure 2:
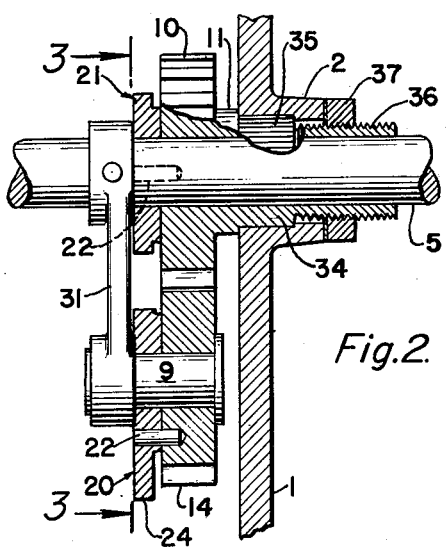
Fig. 2 is a view, partially in section, of another preferred embodiment of the invention which may be incorporated in and removable with a component part.
Figure 3:
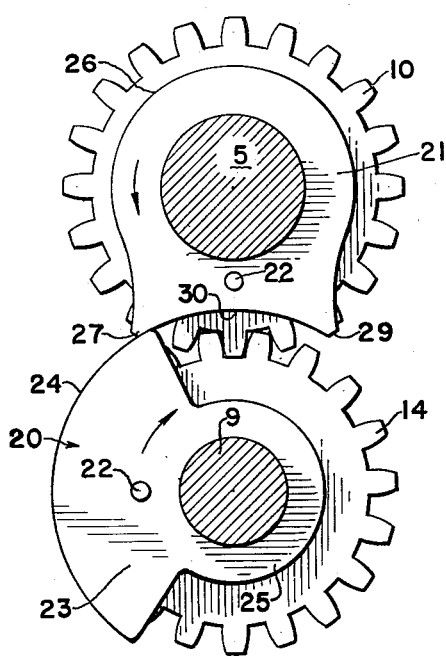
Figure 4:
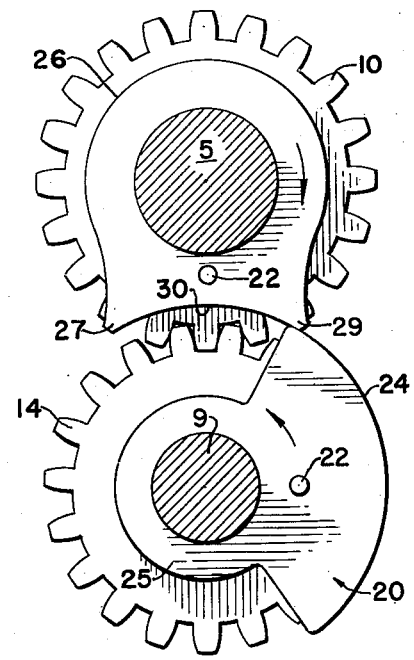

Fig. 3 is a schematic view, looking in the direction indicated by line 3—3 in Figs. 1 and 2, of the hunting tooth stop elements in position at one end of their range of travel; and Fig. 4 is a schematic view, looking in the direction indicated by line 3—3 in Figs. 1 and 2, of the hunting tooth stop elements in position at the end of their range of travel opposite to that shown in Fig. 3.

In the embodiment of Fig. 1, the stop means of the invention have been shown as applied to elements carried by a supporting member 1, which may be a part of a machine frame.

Drive shaft boss 2 formed in supporting member 1 is bored to constitute a drive shaft journal 4, in which a drive shaft 5 may be rotatably supported.

A stub shaft boss 6 is formed in supporting member 1 and bored to form a stub shaft journal 7. Journal 7 is disposed axially parallel to, but displaced from, the drive shaft journal 4. A stub shaft 9 is disposed in the stub shaft journal 7.

Drive shaft 5 has secured thereto a first gear 10 of $n$ teeth. Means such as a first gear hub 11 bearing against support 1, and cooperating with a drive shaft retaining ring 12 disposed on the opposite side of boss 2 may be used to hold the shaft and gear against axial movement.

Stub shaft 9 has secured thereto, in mesh with first gear 10, a second gear 14 having $n \pm 1$ teeth, which may have means such as a second gear hub 15 cooperating with a stub shaft retaining ring 16 to maintain the proper axial relations of the parts.

The second gear 14 may be either rotatably or fixedly mounted on the stub shaft 9. If the former, stub shaft 9 may be fixed in its journal 7, but if the latter, the stub shaft must turn freely in journal 7. It is only necessary to allow the second gear 14 to rotate unrestrictedly with first gear 10, except when the stop mechanism of the invention is effective to prevent it.

The stop mechanism is of the hunting tooth type and comprises cooperating male and female cam members of particular shapes secured to and rotating with the gears. In the drawings, the male cam element 20 is shown in exemplary fashion as associated with the second gear 14, and the female cam element 21 with the first gear 10, but it may be seen that it is immaterial with which of the gears each particular cam element is associated. Each cam element is fixed against rotation relative to its respective gear by conventional means, such as a pin 22. It will also be seen that each of the cams may be formed integrally with the corresponding gear if desired.

The male cam element 20 includes a segmental portion 23 on which a cam surface 24 is formed concentrically about the axis of the associated gear 14. The male cam surface 24 is shown as being of somewhat greater radius than gear 14, while the hub portion 25 is of substantially smaller radius to provide clearance for the female cam teeth during the rotational portion of the operation.

The female cam element 21 similarly has a reduced diameter hub portion 26 so that the male cam 20 may have proper clearance during its rotational phase. The reduced diameter hub portion 26 is bounded by two locking teeth or stop members 27 and 29, which extend radially from the female cam element 21 beyond the outer diameter of gear 10. Teeth 27 and 29 may conveniently by joined by an arc 30 concentric about the stub shaft 9 and of radius equal to that of the male segment 20. This allows those portions of the surfaces of the male segment and the locking tooth engaging at either end of the permissible rotation range to be substantially congruent at the moment of contact. Such construction clearly defines the locking position and minimizes wear by utilizing as large a contact area as possible. The invention will of course function even if the tooth shape differs from that described. For example, the teeth 27 and 29 could be shaped to be tangent to the cam surface 24 at engagement, or could even use point contacts, although this would increase the wear.

In Figs. 3 and 4, the number of teeth $n$ for gear 10 has been shown as 20, while the number of teeth n±1 for gear 14 has been shown as 19. Thus each revolution of gear 10 will advance the relative angular position of gear 14 by an angle equal to that between two adjacent gear teeth.

In Fig. 3, with the directions of rotation as indicated by the arrows, it will be seen that locking tooth 27 is engaging the cam surface 24 so as to prevent further turning. On reversing the direction of rotation of shaft 5, the parts may turn freely until the position of Fig. 4 is reached, when the cam surface 24 is engaged lockingly by the tooth 29. The relative dimensions and angular relations shown for locking cam members 20 and 21 will permit shaft 5 to turn exactly ten revolutions between the positions shown in Figs. 3 and 4. Increasing the angular width of the male cam 20 would reduce the number of turns between stop positions. The maximum angular extent of the male cam 20 is that which will just permit the locking tooth 29 to clear the end of cam 20 opposite to that engaged in Fig. 3 when the direction of rotation is reversed. This would permit one complete revolution, the minimum number of turns possible. The maximum number of free turns will be obtained when the cam 20 is reduced in angular width to the minimum consistent with proper strength for the performance of its stop function. The angular separation of teeth 27 and 29 on the female cam member 26 is of course determined by the necessity that the teeth engage cam 20 susbtantially tangent to the cam surface 24.

Another preferred embodiment of my invention is shown in Fig. 2, in which the axis of rotation of second gear 14 is not fixed relative to the supporting member 1, but is arranged for planetary movement about drive shaft 5. This embodiment might be selected whenever it is desired to use the stop mechanism with an element which must itself be driven about shaft 5, or in which it is desired to be able to insert or remove the rotatable element or component and the stop mechanism as a unit.

In this case, the first gear 10 is fixed relative to the support 1, and drive shaft 5 is journaled therethru for free rotation. A planetary support arm 31 fixed to drive shaft 5 carries stub shaft 9, and second gear 14 is mounted thereon in mesh with first gear 10. It will be obvious that relative angular rotation of the locking cam members 20 and 21 will be produced when the drive shaft 5 turns, just as in the embodiment shown in Fig. 1.

The first gear 10 may be fixed relative to support 1 by conventional means. A cylindrical extension 34 might be formed on hub 11, for example, serrated as at 35, and press fitted into the drive shaft boss 2. Threads 36, cut on the cylindrical extension, and a lock nut 37 may be used to retain the gear 10 firmly in position while shaft 5 rotates therein.

The number of free turns will in either embodiment depend on the spacing of the locking teeth 27 and 29, the angular extent of the male cam segment 20, and the difference in the number of teeth in gears 10 and 14. It will be apparent that the particular dimensions and angular relations of the male and female cam members are not restricted to those shown, but could be varied over a considerable range. For example, the locking teeth may be either greater or lesser in radius than the associated gears, as long as the necessary clearances and locking engagements are provided for. Likewise, the difference in the number of teeth on gears 10 and 14 need not be limited to 1, but may be 2, 3 or any other convenient number. The difference chosen will determine the amount by which the locking teeth will overlap the male cam at the stopping position. When a larger difference in the number of teeth is selected, the overlap, and hence the contact area, is increased. The greater contact area results in an increase in the strength and resistance to wear of the locking teeth.

The rate at which the relative angular positions of the two gears will change is also controlled by the difference in the number of teeth. The angular spread of the cam members will determine the number of allowable revolutions of the drive shaft.

It will be seen from the foregoing that my invention provides simple means for limiting the extent of travel of rotating equipment without interfering with its movement within that range.

I claim:

1. The combination with supporting means of a stop mechanism for preventing rotation beyond desired limits of certain parts associated therewith, comprising complemental meshed hunting tooth gears, having different numbers of teeth, associated with said certain parts of which the rotation is to be limited; a male stop member concentric with one of said gears comprised of a hub portion smaller in radius than the associated gear and a segmental portion greater in radius than the associated gear, said stop member being attached to and movable with said gear; a female stop member disposed in a position to contact the male stop member and lock the gears against further rotation in one direction after completion of an integral number of revolutions thereof, concentric with the other of said gears comprised of a hub portion smaller in radius than the associated gear and a concave extended portion of radius substantially equal to that of the segment of said male stop member, said female stop member being attached to and movable with said other gear.

2. The combination, in a hunting tooth gear stop, of supporting means, a spur gear fixed to said support means, a drive shaft journaled rotatably thru said spur gear, a planetary support secured to said drive shaft, a complemental spur gear carried rotatably by said planetary support about and in mesh with said spur gear, one of said spur gears having one more tooth than the other, and complemental stop abutments on said gears arranged to be brought into locked relation after a number of revolutions of said drive shaft related to the ratio between the numbers of teeth in said gears.

3. A hunting tooth stop mechanism, comprising a support structure; a drive shaft mounted for rotation on said support structure; means for supporting a stub shaft axially parallel to, but displaced from, said drive shaft; a stub shaft supported by said means; a first gear disposed about said drive shaft; a second gear disposed about said stub shaft in mesh with said first gear; the number of teeth in said first and second gears differing by one; a male stop member associated with said first gear having a portion extending beyond the teeth of the gear, including convex abutments defining the ends of the extending portion; a female stop member associated with said second gear, said female member including a pair of spaced concave abutments; said concave abutments lying simultaneously on the circumference of a circle having a radius substantially equal to the radius of the said convex abutment, said convex and concave abutments being arranged to intercept into locking engagement at the desired limits of travel of said drive shaft.

4. Stop means for a mechanism having a rotating drive shaft, comprising a support means, a first gear fixed in said support means and arranged to have said drive shaft rotatably journaled therethru; planetary support means fixed to, and rotatable by, said drive shaft; a stub shaft carried axially parallel to, but displaced from, said drive shaft by said planetary support means; a second gear mounted rotatably on said stub shaft and meshing with said first gear the number of teeth on said first and second gears differing by one; a male stop member secured to one of said gears and having a segmental portion the periphery of which is concentric with, but of radius greater than, the said gear to which it is secured; and a female stop member secured to the other of said gears and having a pair of spaced locking teeth of radius greater than that of the said other of said gears and joined by a concave surface of radius equal to that of said male stop member, said male member being arranged for the engagement therewith of one of said teeth after rotation thru a number of turns.

5. A hunting tooth stop for a driving shaft comprising a supporting structure, a first gear fixed relative to said support, a drive shaft journaled thru said first gear, planetary support means fixed to and rotated by said drive shaft, a stub shaft associated with said planetary support means, a planetary gear mounted rotatably about said stub shaft in mesh with said first gear the number of teeth on said first gear and said planetary gear differing by one; a female stop member secured to, and having a portion of its periphery of diameter substantially less than, one of said gears, said portion being bounded by a pair of spaced locking teeth of substantially greater diameter than said gear; an arcuate portion extending between said teeth and forming the remaining portion of the periphery of said female stop member; and a male stop member secured to, and having a segmental portion of radius greater than the other of said gears and equal to that of said arcuate mating portion, said segmental portion being arranged to be engaged by one of said locking teeth after a certain number of revolutions of said shaft.

6. In a device of the character described, a pair of meshing gears having different numbers of teeth, respectively, a male stop member secured to one of said gears and having a cam surface concentric with said one of said gears and extending over less than a complete circle but continuous between terminal portions thereof, a female stop member secured to the other of said gears and having a pair of teeth extending into intercepting relationship with the path of said male stop member, and means for driving one of said gears.

7. A device according to claim 6 in which the surface of said male stop member is constant in radius between the end portions thereof.

8. The combination with supporting means of a rotational stop mechanism for certain parts associated therewith, comprising complemental hunting tooth gears, having different numbers of teeth, associated with certain parts of which the rotation is to be limited; and stop abutments, carried by said complemental hunting tooth gears and arranged to reach positively locked relation after a predetermined number of whole turns in either direction; said stop abutments comprising a male member and a female member, said female member having two spaced locking teeth, and said male member having a stop portion of substantially constant radius and arcuate extent sufficient to prevent rotation of said parts beyond said predetermined number of whole turns.

9. Stop means for a rotating mechanism, comprising supporting means; a driving shaft rotatably journalled in said supporting means; a stub shaft rotatably journalled in said supporting means axially parallel to, but displaced from, said drive shaft; a driving gear fixed on said drive shaft; a driven gear disposed on said stub shaft and meshing with said driving gear, the number of teeth on said driving gear and said driven gear differing by one; a male stop member mounted on and rotatable with one of said gears and having a portion extending beyond the teeth of said gear, each end of said extending portion being defined by a convex stop abutment; a female stop member mounted on and rotatable with the other of said gears, said concave abutments having a radius substantially equal to the radius of said convex abutments and defined at particular positions by a circle drawn about the center of rotation of said male stop member, said particular position being determined by the locking engagement of the said male and female stop member, said convex and concave abutments being arranged to intercept into locking engagement at the desired limits of travel of said drive shaft, said positions of locking engagement determining said particular position.

10. A hunting tooth stop comprising the combination of supporting means; a journal formed in said supporting means and adapted to receive a drive shaft rotatably; a drive shaft carried by said journal; a second journal formed in said supporting means and arranged to carry a stub shaft parallel to but displaced from said drive shaft; a stub shaft disposed rotatably in said second journal; a first gear secured on said drive shaft; a second gear disposed on said stub shaft and meshing with said first gear, said first and second gears having numbers of teeth differing by one; a male stop member attached to and rotatable with one of said gears, and having a segmental portion greater in radius than the associated gear; the ends of said male stop member being defined by a pair of convex stop abutments; a female stop member attached to and rotatable with the other of said gears and including a pair of concave stop abutments lying simultaneously on the circumference of the circle having a radius substantially equal to the radius of said convex abutment extending beyond the teeth of said associated gear; said convex and concave stop abutments being arranged to intercept into a locking engagement.

11. In combination with a support and drive shaft associated rotatably therewith, means for limiting rotation of said drive shaft to a predetermined whole number of revolutions; comprising a first gear, having a certain number of teeth, mounted on said drive shaft; means for supporting a stub shaft parallel to, but displaced from, said drive shaft, a second gear having a different number of teeth, mounted rotatably about the axis of said stub shaft and meshing with said first gear; a male stop member concentric with one of said gears comprised of a hub portion smaller in radius than the associated gear and a segmental portion greater in radius than the associated gear and mounted on and movable with said first gear; a female stop member disposed in a position to contact the male stop member and lock the gears against further rotation in one direction after completion of an integral number of revolutions thereof, concentric with the other of said gears comprised of a hub portion smaller in radius than the associated gear and a concave extended portion of radius equal to that of the segment of said male stop member and mounted on and movable with said second gear.

References Cited in the file of this patent

UNITED STATES PATENTS

| | | |
|---|---|---|
| 1,203,840 | Bailey | Nov. 7, 1916 |
| 1,994,471 | Gregory | Mar. 19, 1935 |
| 2,372,123 | Sadler | Mar. 20, 1945 |
| 2,453,342 | Rast | Nov. 9, 1948 |
| 2,588,017 | Last | Mar. 4, 1952 |
| 2,599,934 | Opocensky | June 10, 1952 |
| 2,688,882 | Alexy | Sept. 14, 1954 |

FOREIGN PATENTS

| | | |
|---|---|---|
| 376,689 | Norway | Aug. 20, 1923 |
| 503,776 | Germany | July 29, 1930 |